US009929981B2

(12) United States Patent
Gillon et al.

(10) Patent No.: US 9,929,981 B2
(45) Date of Patent: *Mar. 27, 2018

(54) ADDRESS SPACE MAPPING FOR MANAGING ALTERNATIVE NETWORKS FOR HIGH QUALITY OF SERVICE COMMUNICATIONS

(71) Applicant: Ooma, Inc., Palo Alto, CA (US)

(72) Inventors: William M. Gillon, San Mateo, CA (US); Hai Lei, Ottawa (CA); Tobin E. Farrand, Burlingame, CA (US); David A. Bryan, Cedar Park, TX (US)

(73) Assignee: Ooma, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,051

(22) Filed: Oct. 12, 2016

(65) Prior Publication Data

US 2017/0034081 A1    Feb. 2, 2017

Related U.S. Application Data

(63) Continuation of application No. 14/708,132, filed on May 8, 2015, now Pat. No. 9,521,069.

(51) Int. Cl.
*H04J 1/16*      (2006.01)
*H04L 12/939*    (2013.01)
(Continued)

(52) U.S. Cl.
CPC ........ *H04L 49/557* (2013.01); *H04L 12/2898* (2013.01); *H04L 43/0829* (2013.01);
(Continued)

(58) Field of Classification Search
None
See application file for complete search history.

(56) References Cited

U.S. PATENT DOCUMENTS 5,425,085 A    6/1995   Weinberger et al.
5,463,595 A   10/1995   Rodhall et al.
(Continued)

FOREIGN PATENT DOCUMENTS

EP    3050287 A1    8/2016
EP    3146516       3/2017
(Continued)

OTHER PUBLICATIONS

International Search Report and Written Opinion dated Nov. 7, 2014 for App. No. PCT/US2014/044945, filed Jun. 30, 2014. 12 pages.
(Continued)

*Primary Examiner* — Edan Orgad
*Assistant Examiner* — Sithu Ko
(74) *Attorney, Agent, or Firm* — Carr & Ferrell LLP

(57) ABSTRACT

Methods and systems are provided. Exemplary methods may include: providing a first data packet to a first interface, the first data packet including a first address and being received from a computing device, the computing device being at a premises and coupled to a third interface, the first interface coupled to a first broadband connection received at the premises, the first broadband connection being coupled to a service using a first data network; determining at least one second data packet to be received at the first interface from the service is lost or delayed; supplying a second address to the computing device for communications with the service, in response to the determining; receiving from the computing device a third data packet including the second address; modifying the third data packet including replacing the second address with the first address; and giving the modified third data packet to a second interface.

14 Claims, 7 Drawing Sheets

(51) Int. Cl.
  *H04L 12/707* (2013.01)
  *H04L 12/703* (2013.01)
  *H04L 12/741* (2013.01)
  *H04L 29/06* (2006.01)
  *H04L 12/26* (2006.01)
  *H04L 29/12* (2006.01)
  *H04L 12/851* (2013.01)
  *H04L 29/08* (2006.01)
  *H04L 12/28* (2006.01)

(52) U.S. Cl.
  CPC ...... *H04L 43/0852* (2013.01); *H04L 43/0894* (2013.01); *H04L 43/16* (2013.01); *H04L 45/22* (2013.01); *H04L 45/28* (2013.01); *H04L 45/74* (2013.01); *H04L 47/24* (2013.01); *H04L 61/106* (2013.01); *H04L 65/4015* (2013.01); *H04L 67/16* (2013.01); *H04L 69/14* (2013.01); *Y02B 60/33* (2013.01)

(56) References Cited

U.S. PATENT DOCUMENTS

| | | | |
|---|---|---|---|
| 5,519,769 A | 5/1996 | Weinberger et al. | |
| 5,796,736 A | 8/1998 | Suzuki | |
| 6,023,724 A | 2/2000 | Bhatia et al. | |
| 6,377,938 B1 | 4/2002 | Block et al. | |
| 6,487,197 B1 | 11/2002 | Elliott | |
| 6,615,264 B1 | 9/2003 | Stoltz et al. | |
| 6,697,358 B2 | 2/2004 | Bernstein | |
| 6,714,545 B1 | 3/2004 | Hugenberg et al. | |
| 6,775,267 B1 * | 8/2004 | Kung | H04L 12/14 370/352 |
| 6,778,528 B1 | 8/2004 | Blair et al. | |
| 6,781,983 B1 | 8/2004 | Armistead | |
| 6,914,900 B1 | 7/2005 | Komatsu et al. | |
| 6,934,258 B1 | 8/2005 | Smith et al. | |
| 7,113,090 B1 | 9/2006 | Saylor et al. | |
| 7,124,506 B2 | 10/2006 | Yamanashi et al. | |
| 7,127,043 B2 | 10/2006 | Morris | |
| 7,127,506 B1 | 10/2006 | Schmidt et al. | |
| 7,154,891 B1 * | 12/2006 | Callon | H04L 29/12009 370/392 |
| 7,280,495 B1 | 10/2007 | Zweig et al. | |
| 7,295,660 B1 | 11/2007 | Higginbotham et al. | |
| 7,342,925 B2 | 3/2008 | Cherchali et al. | |
| 7,376,124 B2 | 5/2008 | Lee et al. | |
| 7,394,803 B1 | 7/2008 | Petit-Huguenin et al. | |
| 8,140,392 B2 | 3/2012 | Altberg et al. | |
| 8,331,547 B2 | 12/2012 | Smith et al. | |
| 8,350,694 B1 | 1/2013 | Trundle et al. | |
| 8,515,021 B2 | 8/2013 | Farrand et al. | |
| 8,634,520 B1 | 1/2014 | Morrison et al. | |
| 8,837,698 B2 | 9/2014 | Altberg et al. | |
| 9,225,626 B2 | 12/2015 | Capper et al. | |
| 9,386,148 B2 | 7/2016 | Farrand et al. | |
| 9,521,069 B2 | 12/2016 | Gillon et al. | |
| 9,560,198 B2 | 1/2017 | Farrand et al. | |
| 9,633,547 B2 | 4/2017 | Farrand et al. | |
| 9,667,782 B2 | 5/2017 | Farrand et al. | |
| 9,787,611 B2 | 10/2017 | Gillon et al. | |
| 2001/0053194 A1 | 12/2001 | Johnson | |
| 2002/0016718 A1 | 2/2002 | Rothschild et al. | |
| 2002/0035556 A1 | 3/2002 | Shah et al. | |
| 2002/0037750 A1 | 3/2002 | Hussain et al. | |
| 2002/0038167 A1 | 3/2002 | Chirnomas | |
| 2002/0085692 A1 | 7/2002 | Katz | |
| 2002/0133614 A1 | 9/2002 | Weerahandi et al. | |
| 2002/0140549 A1 | 10/2002 | Tseng | |
| 2002/0165966 A1 | 11/2002 | Widegren et al. | |
| 2003/0027602 A1 | 2/2003 | Han et al. | |
| 2003/0058844 A1 | 3/2003 | Sojka et al. | |
| 2003/0099334 A1 | 5/2003 | Contractor | |
| 2003/0141093 A1 * | 7/2003 | Tirosh | H04L 45/00 174/72 A |
| 2003/0164877 A1 | 9/2003 | Murai | |
| 2003/0184436 A1 | 10/2003 | Seales et al. | |
| 2003/0189928 A1 | 10/2003 | Xiong | |
| 2004/0010472 A1 | 1/2004 | Hilby et al. | |
| 2004/0010569 A1 | 1/2004 | Thomas et al. | |
| 2004/0017803 A1 | 1/2004 | Lim et al. | |
| 2004/0059821 A1 | 3/2004 | Tang et al. | |
| 2004/0086093 A1 | 5/2004 | Schranz | |
| 2004/0090968 A1 | 5/2004 | Kimber et al. | |
| 2004/0105444 A1 | 6/2004 | Korotin et al. | |
| 2004/0160956 A1 | 8/2004 | Hardy et al. | |
| 2004/0235509 A1 | 11/2004 | Burritt et al. | |
| 2005/0027887 A1 | 2/2005 | Zimler et al. | |
| 2005/0036590 A1 | 2/2005 | Pearson et al. | |
| 2005/0074114 A1 | 4/2005 | Fotta et al. | |
| 2005/0078681 A1 | 4/2005 | Sanuki et al. | |
| 2005/0089018 A1 | 4/2005 | Schessel | |
| 2005/0097222 A1 | 5/2005 | Jiang et al. | |
| 2005/0105708 A1 | 5/2005 | Kouchri et al. | |
| 2005/0141485 A1 | 6/2005 | Miyajima et al. | |
| 2005/0169247 A1 | 8/2005 | Chen | |
| 2005/0222820 A1 | 10/2005 | Chung | |
| 2005/0238034 A1 | 10/2005 | Gillespie et al. | |
| 2005/0246174 A1 | 11/2005 | DeGolia | |
| 2005/0259637 A1 | 11/2005 | Chu et al. | |
| 2006/0007915 A1 | 1/2006 | Frame | |
| 2006/0009240 A1 | 1/2006 | Katz | |
| 2006/0013195 A1 | 1/2006 | Son et al. | |
| 2006/0092011 A1 | 5/2006 | Simon et al. | |
| 2006/0114894 A1 | 6/2006 | Cherchali et al. | |
| 2006/0140352 A1 | 6/2006 | Morris | |
| 2006/0156251 A1 | 7/2006 | Suhail et al. | |
| 2006/0167746 A1 | 7/2006 | Zucker | |
| 2006/0187898 A1 | 8/2006 | Chou et al. | |
| 2006/0187900 A1 | 8/2006 | Akbar | |
| 2006/0243797 A1 | 11/2006 | Apte et al. | |
| 2006/0251048 A1 | 11/2006 | Yoshino et al. | |
| 2006/0258341 A1 | 11/2006 | Miller et al. | |
| 2006/0259767 A1 | 11/2006 | Mansz et al. | |
| 2006/0268828 A1 | 11/2006 | Yarlagadda | |
| 2006/0268848 A1 | 11/2006 | Larsson et al. | |
| 2007/0036314 A1 | 2/2007 | Kloberdans et al. | |
| 2007/0037560 A1 | 2/2007 | Yun et al. | |
| 2007/0037605 A1 | 2/2007 | Logan | |
| 2007/0041517 A1 | 2/2007 | Clarke et al. | |
| 2007/0049342 A1 | 3/2007 | Mayer et al. | |
| 2007/0054645 A1 | 3/2007 | Pan | |
| 2007/0061735 A1 | 3/2007 | Hoffberg et al. | |
| 2007/0067219 A1 | 3/2007 | Altberg et al. | |
| 2007/0071212 A1 | 3/2007 | Quittek et al. | |
| 2007/0118750 A1 | 5/2007 | Owen et al. | |
| 2007/0121593 A1 | 5/2007 | Vance et al. | |
| 2007/0121596 A1 | 5/2007 | Kurapati et al. | |
| 2007/0132844 A1 | 6/2007 | Katz | |
| 2007/0133757 A1 | 6/2007 | Girouard et al. | |
| 2007/0153776 A1 | 7/2007 | Joseph et al. | |
| 2007/0165811 A1 | 7/2007 | Reumann et al. | |
| 2007/0183407 A1 | 8/2007 | Bennett et al. | |
| 2007/0203999 A1 | 8/2007 | Townsley et al. | |
| 2007/0223455 A1 | 9/2007 | Chang et al. | |
| 2007/0255702 A1 | 11/2007 | Orme | |
| 2007/0283430 A1 | 12/2007 | Lai et al. | |
| 2007/0298772 A1 | 12/2007 | Owens et al. | |
| 2008/0049748 A1 * | 2/2008 | Bugenhagen | H04L 12/14 370/389 |
| 2008/0075248 A1 | 3/2008 | Kim | |
| 2008/0075257 A1 | 3/2008 | Nguyen et al. | |
| 2008/0084975 A1 | 4/2008 | Schwartz | |
| 2008/0089325 A1 | 4/2008 | Sung | |
| 2008/0097819 A1 | 4/2008 | Whitman | |
| 2008/0111765 A1 | 5/2008 | Kim | |
| 2008/0125095 A1 | 5/2008 | Mornhineway et al. | |
| 2008/0144625 A1 | 6/2008 | Wu et al. | |
| 2008/0144884 A1 | 6/2008 | Habibi | |
| 2008/0159515 A1 | 7/2008 | Rines | |
| 2008/0168145 A1 | 7/2008 | Wilson | |
| 2008/0196099 A1 | 8/2008 | Shastri | |
| 2008/0200142 A1 | 8/2008 | Abdel-Kader et al. | |
| 2008/0225749 A1 | 9/2008 | Peng et al. | |

(56) References Cited

U.S. PATENT DOCUMENTS

| | | |
|---|---|---|
| 2008/0247401 A1 | 10/2008 | Bhal et al. |
| 2008/0298348 A1 | 12/2008 | Frame et al. |
| 2008/0313297 A1 | 12/2008 | Heron et al. |
| 2008/0316946 A1 | 12/2008 | Capper et al. |
| 2009/0106318 A1 | 4/2009 | Mantripragada et al. |
| 2009/0135008 A1 | 5/2009 | Kirchmeier et al. |
| 2009/0168755 A1 | 7/2009 | Peng et al. |
| 2009/0213999 A1 | 8/2009 | Farrand et al. |
| 2009/0224931 A1 | 9/2009 | Dietz et al. |
| 2009/0240586 A1 | 9/2009 | Ramer et al. |
| 2009/0253428 A1 | 10/2009 | Bhatia et al. |
| 2009/0303042 A1 | 12/2009 | Song et al. |
| 2009/0319271 A1 | 12/2009 | Gross |
| 2010/0034121 A1 | 2/2010 | Bozionek |
| 2010/0046530 A1 | 2/2010 | Hautakorpi et al. |
| 2010/0046731 A1 | 2/2010 | Gisby et al. |
| 2010/0098058 A1 | 4/2010 | Delangis |
| 2010/0098235 A1 | 4/2010 | Cadiz et al. |
| 2010/0114896 A1 | 5/2010 | Clark et al. |
| 2010/0136982 A1 | 6/2010 | Zabawskyj et al. |
| 2010/0191829 A1* | 7/2010 | Cagenius ............ H04L 12/2834 709/219 |
| 2010/0229452 A1 | 9/2010 | Suk |
| 2010/0302025 A1 | 12/2010 | Script |
| 2011/0054689 A1 | 3/2011 | Nielsen et al. |
| 2011/0111728 A1 | 5/2011 | Ferguson et al. |
| 2011/0140868 A1 | 6/2011 | Hovang |
| 2011/0170680 A1 | 7/2011 | Chislett et al. |
| 2011/0183652 A1 | 7/2011 | Eng et al. |
| 2011/0265145 A1 | 10/2011 | Prasad et al. |
| 2012/0027191 A1 | 2/2012 | Baril et al. |
| 2012/0035993 A1 | 2/2012 | Nangia |
| 2012/0036576 A1 | 2/2012 | Iyer |
| 2012/0047442 A1 | 2/2012 | Nicolaou et al. |
| 2012/0099716 A1 | 4/2012 | Rae et al. |
| 2012/0284778 A1 | 11/2012 | Chiou et al. |
| 2012/0320905 A1 | 12/2012 | Ilagan |
| 2012/0329420 A1 | 12/2012 | Zotti et al. |
| 2013/0018509 A1 | 1/2013 | Korus |
| 2013/0035774 A1 | 2/2013 | Warren et al. |
| 2013/0053005 A1 | 2/2013 | Ramer et al. |
| 2013/0070928 A1 | 3/2013 | Ellis et al. |
| 2013/0214925 A1 | 8/2013 | Weiss |
| 2013/0272219 A1 | 10/2013 | Singh et al. |
| 2013/0288639 A1 | 10/2013 | Varsavsky Waisman-Diamond |
| 2013/0293368 A1 | 11/2013 | Ottah et al. |
| 2013/0336174 A1 | 12/2013 | Rubin et al. |
| 2014/0022915 A1 | 1/2014 | Caron et al. |
| 2014/0084165 A1 | 3/2014 | Fadell et al. |
| 2014/0085093 A1 | 3/2014 | Mittleman et al. |
| 2014/0101082 A1 | 4/2014 | Matsuoka et al. |
| 2014/0120863 A1 | 5/2014 | Ferguson et al. |
| 2014/0169274 A1 | 6/2014 | Kweon et al. |
| 2014/0266699 A1 | 9/2014 | Poder et al. |
| 2014/0306802 A1 | 10/2014 | Hibbs, Jr. |
| 2014/0358666 A1 | 12/2014 | Baghaie et al. |
| 2015/0065078 A1 | 3/2015 | Mejia et al. |
| 2015/0071450 A1 | 3/2015 | Boyden et al. |
| 2015/0086001 A1 | 3/2015 | Farrand et al. |
| 2015/0087280 A1 | 3/2015 | Farrand et al. |
| 2015/0100167 A1 | 4/2015 | Sloo et al. |
| 2015/0117624 A1 | 4/2015 | Rosenshine |
| 2015/0145693 A1 | 5/2015 | Toriumi et al. |
| 2015/0177114 A1 | 6/2015 | Kapoor et al. |
| 2015/0244873 A1 | 8/2015 | Boyden et al. |
| 2015/0262435 A1 | 9/2015 | Delong et al. |
| 2015/0281450 A1 | 10/2015 | Shapiro et al. |
| 2015/0339912 A1 | 11/2015 | Farrand et al. |
| 2016/0012702 A1 | 1/2016 | Hart et al. |
| 2016/0078750 A1 | 3/2016 | King et al. |
| 2016/0142758 A1 | 5/2016 | Karp et al. |
| 2016/0173693 A1 | 6/2016 | Spievak et al. |
| 2016/0277573 A1 | 9/2016 | Farrand et al. |
| 2016/0330108 A1 | 11/2016 | Gillon et al. |
| 2016/0330319 A1 | 11/2016 | Farrand et al. |
| 2016/0373372 A1 | 12/2016 | Gillon et al. |
| 2017/0034044 A1 | 2/2017 | Gillon et al. |
| 2017/0034045 A1 | 2/2017 | Gillon et al. |
| 2017/0034062 A1 | 2/2017 | Gillon et al. |
| 2017/0084164 A1 | 3/2017 | Farrand et al. |
| 2017/0104875 A1 | 4/2017 | Im et al. |

FOREIGN PATENT DOCUMENTS

| | | |
|---|---|---|
| EP | 3167340 | 5/2017 |
| WO | WO2015041738 A1 | 3/2015 |
| WO | WO2015179120 A1 | 11/2015 |
| WO | WO2016007244 A1 | 1/2016 |
| WO | WO2016182796 A1 | 11/2016 |

OTHER PUBLICATIONS

International Search Report and Written Opinion dated Jul. 27, 2015 for App. No. PCT/US2015/029109, filed May 4, 2015, 12 pages.

International Search Report and Written Opinion dated Nov. 2, 2015 for App. No. PCT/US2015/034054, filed Jun. 3, 2015, 15 pages.

Life Alert. "Life Alert's Four Layers of Protection, First Layer of Protection: Protection at Home." https://web.archive.org/web/20121127094247/http://www.lifealert.net/products/homeprotection.html. [retrieved Oct. 13, 2015], 4 pages.

International Search Report and Written Opinion dated Jun. 30, 2016 for App. No. PCT/US2016/030597, filed May 3, 2016, 12 pages.

European Patent Application No. 14845956.3, "Extended European Search Report," dated Feb. 16, 2017, 8 pages.

"Office Action," Canadian Patent Application No. 2949211, dated Aug. 16, 2017, 4 pages.

"Office Action," Canadian Patent Application No. 2954351, dated Oct. 27, 2017, 3 pages.

International Search Report and "Written Opinion of the International Searching Authority," Patent Cooperation Treaty Application No. PCT/US2017/048284, dated Nov. 8, 2017, 8 pages.

* cited by examiner

US 9,929,981 B2

ADDRESS SPACE MAPPING FOR MANAGING ALTERNATIVE NETWORKS FOR HIGH QUALITY OF SERVICE COMMUNICATIONS

CROSS-REFERENCE TO RELATED APPLICATIONS

This application is a continuation of U.S. patent application Ser. No. 14/708,132, filed May 8, 2015, which is hereby incorporated by reference herein in its entirety, including all references and appendices cited therein.

FIELD OF THE INVENTION

The present technology pertains to data networks, and more specifically to high quality of service communications.

BACKGROUND ART

Data bandwidth provided by a hardwired broadband internet connection to a home or small office is finite and divided among competing applications and computing devices. While Internet traffic is handled on a "best effort" basis, current multimedia traffic (e.g., video, voice, and the like) cannot tolerate increasing lost or delayed data before the user experience is degraded. Some home and small office routers can be configured to assign a priority to each device and/or service operating on the home or small office network and control the amount of bandwidth each is allowed to consume. In this way, the computer network performance (perceived by the user), referred to as quality of service (QoS), is managed. If the data loss or data delay occurs outside of the home or small office network (e.g., in an Internet service provider's (ISP's) network, an upstream ISP's network, and the like), then conventionally managing QoS at the home and small office router as described above has limited effect.

SUMMARY OF THE INVENTION

Some embodiments of the present technology include systems for managing alternative networks. The system may include: a first interface coupled to a first broadband connection received at a premises, the first broadband connection being coupled to a service outside the premises using a first data network; a second interface coupled to a second broadband connection received at the premises, the second broadband connection being coupled to the service outside the premises using a second data network and being different from the first broadband connection; a third interface coupled to a computing device at the premises; a processor coupled to the first, second, and third interfaces; and a memory coupled to the processor, the memory storing instructions executable by the processor to perform a method comprising: providing a first data packet to the first interface, the first data packet including a first address and being received from the computing device; determining at least one second data packet to be received at the first interface from the service is lost or delayed; supplying a second address to the computing device for communications with the service, in response to the determining; receiving from the computing device a third data packet including the second address; modifying the third data packet including replacing the second address with the first address; and giving the modified third data packet to the second interface.

According to various embodiments of the present technology include methods for managing alternative networks. The methods may comprise: providing a first data packet to a first interface, the first data packet including a first address and being received from a computing device, the computing device being at a premises and coupled to a third interface, the first interface coupled to a first broadband connection received at the premises, the first broadband connection being coupled to a service outside the premises using a first data network; determining at least one second data packet to be received at the first interface from the service is lost or delayed; supplying a second address to the computing device for communications with the service, in response to the determining; receiving from the computing device a third data packet including the second address; modifying the third data packet including replacing the second address with the first address; and giving the modified third data packet to a second interface, the second interface coupled to a second broadband connection received at the premises, the second broadband connection being coupled to the service outside the premises using a second data network and being different from the first broadband connection.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
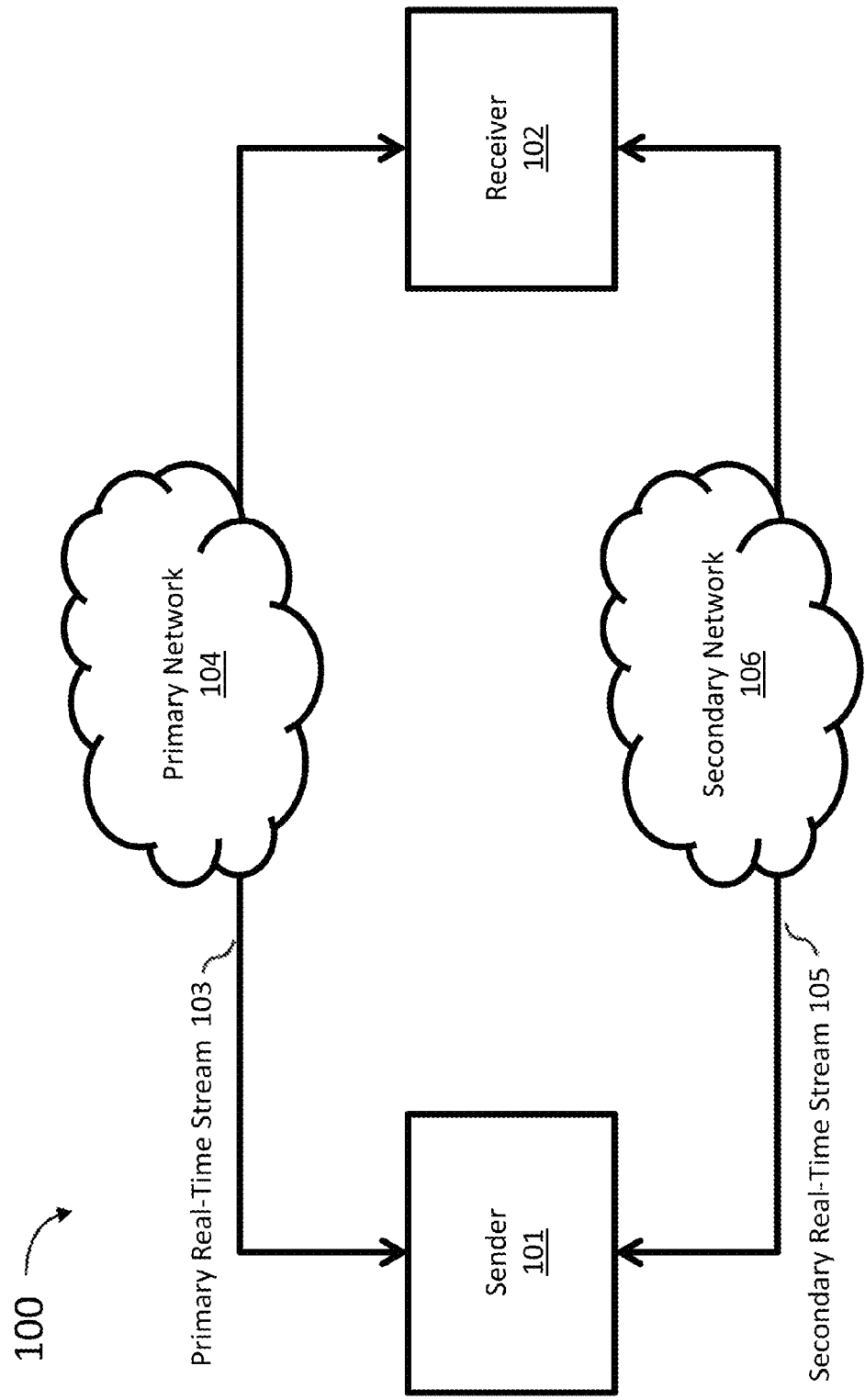
FIG. 1 is a simplified block diagram of a communications system, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Some data networks use a packet-switched approach to transport information between locations. A packet-switched approach breaks up the information into a number of discrete segments, each segment called a packet (also referred to as a datagram, segment, frame, cell, protocol data unit (PDU), and service data unit (SDU). (Numeric) Addresses, such as an Internet Protocol address (IP address), identify each machine (e.g., physical and/or virtual host) and packets are routed from one machine to another over the network using these addresses. Assuming they arrive properly, the packets are re-assembled by the receiving party to reassemble the original information. An alternative to a packet-switched approach is to dedicate a fixed link between sender and receiver for the duration of the time they desire to communicate, an approach known as circuit switching. Packet switching is generally preferred for a number of reasons. One reason is that this is a versatile technique to allow for multiple streams of data to be interleaved or multiplexed on a single physical connection. Another is that portions of the message may be sent over different paths to improve performance or avoid network failures.

Unfortunately, for a variety of reasons packets may be lost when transmitted between the sender and the receiver. Various intermediary devices (e.g., routers, switches, gateways, etc.) that route the packets over available paths between two addresses may become overloaded/congested. Additionally, links between devices may fail, interference may corrupt packets that then must be discarded, resent, etc. For that reason, packet based networks, and the applications built on top of them can use a number of approaches to deal with packet loss. By way of non-limiting example, a "reliable" transport mechanism, such as that provided by Transmission Control Protocol (TCP), is used. TCP is described further in "TCP Congestion Control", IETF RFC 5681, M. Allman et al., 2009, Internet Engineering Taskforce, which is hereby incorporated by reference in its entirety for any purpose. TCP (and the like) use various techniques to determine if packets have arrived at the destination in a certain time (e.g., several seconds), and if not, to retransmit those lost packets. Note: this is an advantage of packet switched networks, as only the missing packets need be retransmitted.

TCP (and the like) mechanisms can be effective in a bad (e.g., congested and/or lossy) network, but their utility diminishes in a time-sensitive or real-time application. For example, some real-time applications can tolerate the loss of a few packets, which is preferable to receiving a delayed packet. As an example, the loss of half a second of audio during a radio transmission or a phone call is little more than an annoyance, but receiving and replaying that half-second of audio ten seconds later would be very disruptive. Such applications are called "loss-tolerant applications," and include streaming audio and video, and audio and video communications. Instead of retransmitting, loss-tolerant applications attempt to reduce the incidence/rate and impact of lost packets.

As a result, while some loss is acceptable, different methods are used to reduce lost packet rates for real-time streams. For example, redundant information is used. In this approach, additional, redundant information is used to encode the real-time information and is transmitted along with the original copy. While packets may still be lost, the redundant information can be used to reconstruct the information including lost information, provided too many are not lost. Higher levels of redundancy increase reliability but also increase bandwidth used. For example, Real-time Transport Protocol (RTP), an Internet standard to encapsulate and transport real-time media (e.g., audio, video, etc.) provides an extension to allow marking and transmitting of redundant data alongside the original data. RTP is described further in "RTP: A Transport Protocol for Real-Time Applications", IETF RFC 3550, H. Schulzrinne et al., 2003, Internet Engineering Taskforce and "RTP Payload for Redundant Audio Data", IETF RFC 2198, C. Perkins et al., 1997, Internet Engineering Taskforce, which are each incorporated by reference in their entirety for any purpose.

Another technique is to reduce the loss of packets by reducing the quality of the transmission. Lower quality streams require less data to represent, and results in less traffic on the network, in many cases reducing packet loss. A slightly lower quality, but more complete stream, may be preferable, for example during in a phone conversation.

Despite the above techniques, at times the quality of a network connection degrades so much that these techniques are insufficient to produce an acceptable user experience, referred to as Quality of Service (QoS). The network connection simply becomes too degraded to support the real-time stream. QoS is the overall performance of a telephony or computer network, particularly the performance seen/experienced by the users of the network.

As described above, packets can be routed by using network addresses. These addresses uniquely (at least within one organization or location, discussed below) identify various hosts on the network and allow information to be sent from one host to another. Addresses can be numeric (binary) identifiers, by way of non-limiting example, 32-bit Internet Protocol version 4 (IPv4) addresses (e.g., represented as dotted decimal format for human use, such as 192.168.1.1) and the longer 128 bit Internet Protocol version 6 (IPv6) format (e.g., represented as 32 hexadecimal values for human use). IPv4 addresses are identified by four numbers from 0-255 (e.g., 0.0.0.0 to 255.255.255.255), resulting in $2^{32}$ possible addresses in the address space (although some can be reserved for various purposes). The IPv6 has the advantage of a larger address space than IPv4, which allows more devices to be identified.

Establishing and controlling real-time streams may be logically composed of several functions. In one function, the two parties needing to communicate exchange information to negotiate or initiate the connection and control it. This requires, minimally, the exchange of locations where each party should send information (e.g., IP address and port), allowing the other party to receive it. This may include sending instructions to play, pause, rewind, or fast-forward for pre-recorded media; or to initiate, end, transfer, place on hold, or change properties exchange (switch from audio to video, for example) for an interactive session.

Protocols which may be used to control interactive sessions include: the Internet Engineering Task Force's (IETF) Session Initiation Protocol (SIP); the IETF Extensible Messaging and Presence Protocol (XMPP); and the International Telecommunication Union's (ITU) H.323 protocol, as well as the emerging IETF/World Wide Web Consortium (W3C) work on RTCWeb and WebRTC (which describe how to negotiate such sessions between web browsers). For (pre-) recorded content, the IETF Real Time Streaming Protocol (RTSP) may be used. Other protocols and proprietary mechanisms may also be used. Several protocols also take advantage of the IETF's Session Description Protocol (SDP), encapsulating SDP to describe the actual format (encoding) of the media being exchanged. The above protocols are described further in "SIP: Session Initiation Protocol", IETF RFC 3261, J. Rosenberg et al., June 2002, Internet Engineering Taskforce; "Extensible Messaging and Presence Protocol (XMPP): Core", IETF RFC 6120, P. Saint-Andre, March 2011, Internet Engineering Taskforce; Defined by multiple ITU documents, see Wikipedia entry, http://en.wikipedia.org/wiki/H.323; RTCWEB Working group, works in progress, Internet Engineering Taskforce; "Real Time Streaming Protocol (RTSP)", IETF RFC 2326, H. Schulzrinne et al., 1998, Internet Engineering Taskforce; and "SDP: Session Description Protocol", IETF RFC 4566, M. Handley et al., 2006, Internet Engineering Taskforce, each of which is incorporated by reference in its entirety for any purpose.

By way of non-limiting example, the IETF SIP Protocol defines mechanism where parties may establish real-time sessions, tear down sessions, or renegotiate the connection for the session. SIP is used to negotiate audio, video, gaming, and other real-time sessions. SIP can be used for Internet telephone calls. In such embodiments, an initial SIP message may be sent from one side to the other indicating that they would like engaging in a call ("ringing" the other party), and indicating an IP address where audio may be sent to reach them. If the other side accepts the call, it replies with an IP address where it may receive audio, and the users can send media to each other. Subsequently, if the call is transferred (e.g., to another party, to a virtual machine (VM) server, or to a different phone device), SIP can be used to renegotiate the addresses where media should be sent.

Another function is the actual exchange of the real-time information (media). After negotiating how data is to be controlled, where it is to be sent, and how it is encoded, as described above, this function controls the transport of the data. For example, a mechanism to facilitate sending the real-time (e.g., media) packets is a combination of a two IETF protocols: RTP and RTP Control Protocol (RTCP). In some embodiments, RTP defines how to encapsulate the packets or frames of media, and provides a number of headers that help describe and transport the data. Among the information RTP provides fields to describe are: the type of data (payload type), which defines what encoding or codec is used/being sent; timestamps indicating the time various packets were sent; sequence numbers to identify the order of the packets and track lost packets; information about the source; and information that helps synchronize multiple streams (e.g., two audio streams for stereo, or video and audio streams that should be correlated). RTP also provides extensions allowing redundant data packets to be marked.

RTCP may be used to send information alongside the media streams, using a different logical communications channel or stream. As such, it is an "out-of-band" communications mechanism. RTCP sends periodic reports back and forth, allowing senders and receivers to understand how well the information is flowing between them. These statistics can be used to adjust the flow of information to account for slow network connections, lost packets, overwhelmed receivers, etc., and can also be used to determine the likely quality of the user experience (e.g., QoS). Actions may be taken in response to RTCP reports, such as increasing or lowering the quality of the source media and increasing or decreasing redundancy in response to lost packets. In some embodiments, instead of using a separate control channel, control information can be included in-band, within specially marked packets within the media stream (for example, directly within the RTP packets).

Other protocols may be used for streaming. By way of non-limiting example, the Real Time Messaging Protocol (RTMP) streams audio and video data for Flash applications. DASH, or Dynamic Adaptive Streaming over HTTP is a technique or protocol that can block media and transmit the blocked media over HTTP connections.

FIG. 1 illustrates system 100 for providing redundancy via a secondary channel to a consumer or small office. Embodiments of system 100 include a network telephone or video system. System 100 includes a Sender 101, sending Real-Time Stream 103 to Receiver 102 via Primary Network 104. Real-Time Stream 103 can include a variety of information that needs to be sent from the sender to the receiver in a timely manner, sensitive to delay, delivery time, etc. In an exemplary embodiment, Real-Time Stream 103 could be media for a phone call (e.g., the sender's voice being sent to the receiver, or to a service provider device such as a switch, soft-switch, gateway, or similar device), and other kinds of applications, such as home automation, home security, real-time information from sensors, video information, game information (e.g., position of a character, information about actions taken, etc.), and many other types of time critical information. In some embodiments, Real-Time Stream 103 is a telephone call, conveyed using IETF RTP protocol packets, and negotiated using IETF SIP protocol packets.

In various embodiments, Primary Network 104 is a packet-switched data network, in which information is broken into small blocks of information, or packets, to be sent across the network. For example, the primary network could be a wired connection to the public Internet (e.g., cable, DSL, fiber, etc.), wireless connection to the public Internet (e.g., WiMAX and the like), and any type of public or private data network over wired or wireless access media. By way of non-limiting example, the primary network can be: leased T-carrier line; Synchronous Optical Networking (SONET); Synchronous Digital Hierarchy (SDH); cable internet access; Digital Subscriber Line (DSL); Fiber-to-the-home (FTTH); Broadband over power lines (BPL); WiFi (e.g., based on Institute of Electrical and Electronics Engineers (IEEE) 802.11 standard); Global System for Mobile Communications (GSM) Circuit Switched Data (CSD), General packet radio service (GPRS), and Enhanced Data rates for GSM Evolution (EDGE); Cellular Digital Packet Data (CDPD); Wideband Code Division Multiple Access (WCDMA); High Speed Packet Access (HSPA); Universal Mobile Telecommunications System (UMTS)—time-division duplexing (TDD); CDMA2000; Evolved High-Speed Packet Access (HSPA+); Worldwide Interoperability for Microwave Access (WiMAX); Long-Term Evolution (4G LTE); LTE Advanced; Mobile Broadband Wireless Access (MBWA); satellite broadband; and the like.

A second, physically independent network, Secondary Network 106, is also included in system 100. Selectively, Secondary Real-Time Stream 105 may be sent over Secondary Network 106 under certain conditions. In an exemplary embodiment, this could be a secondary wireless network from a mobile provider (e.g., 4G, WiMAX, etc.), a second broadband connection (e.g., cable, DSL, fiber, WiMAX, etc.), and a connection through another connected consumer device in the home (e.g., a mobile device such as a cellular phone, smart phone, phablet computer, tablet computer, notebook computer, and the like). Any of these networks can provide a backup connection in the case of the failure of Primary Network 104. Secondary Network 106 may be any type of public or private data network over wired or wireless access media, for example, as described in relation to Primary Network 104.

In embodiments where Primary Network 104 and Secondary Network 106 use a same type of access media, Primary Network 104 and Secondary Network 106 are different and distinct instances of the access media type. By way of non-limiting example, two separate cable lines, two separate DSL lines, two different mobile internet service providers (e.g., AT&T Mobility, Bouygues, China Mobile, China Unicom; China Telecom, EE, E-Plus, KDDI, NTT DoCoMo, $O_2$, Orange, SFR, SoftBank, Sprint, Mobile, Telekom, T-Mobile, Verizon Wireless, Vodaphone, Y!mobile, etc.), and the like.

FIG. 1 illustrates a simplified flow from Sender 101 to Receiver 102, but as would be readily appreciated by one of ordinary skill in the art, System 100 may be symmetric, supporting a bi-directional flow, or involve multiple senders and/or receivers (e.g., one-to-many or many-to-many flows). That is, the role of and term "Sender" or "Receiver" is a logical, not absolute one. Primary Network 104 and Secondary Network 106 will themselves may also be bi-directional (e.g., Receiver 102 can also send information to Sender 101). In the exemplary embodiment of a phone call being carried over the real-time stream, for example, there would be one flow in each direction, and at various times (depending on who is speaking) either party could be considered the sender or receiver.

Figure 2:
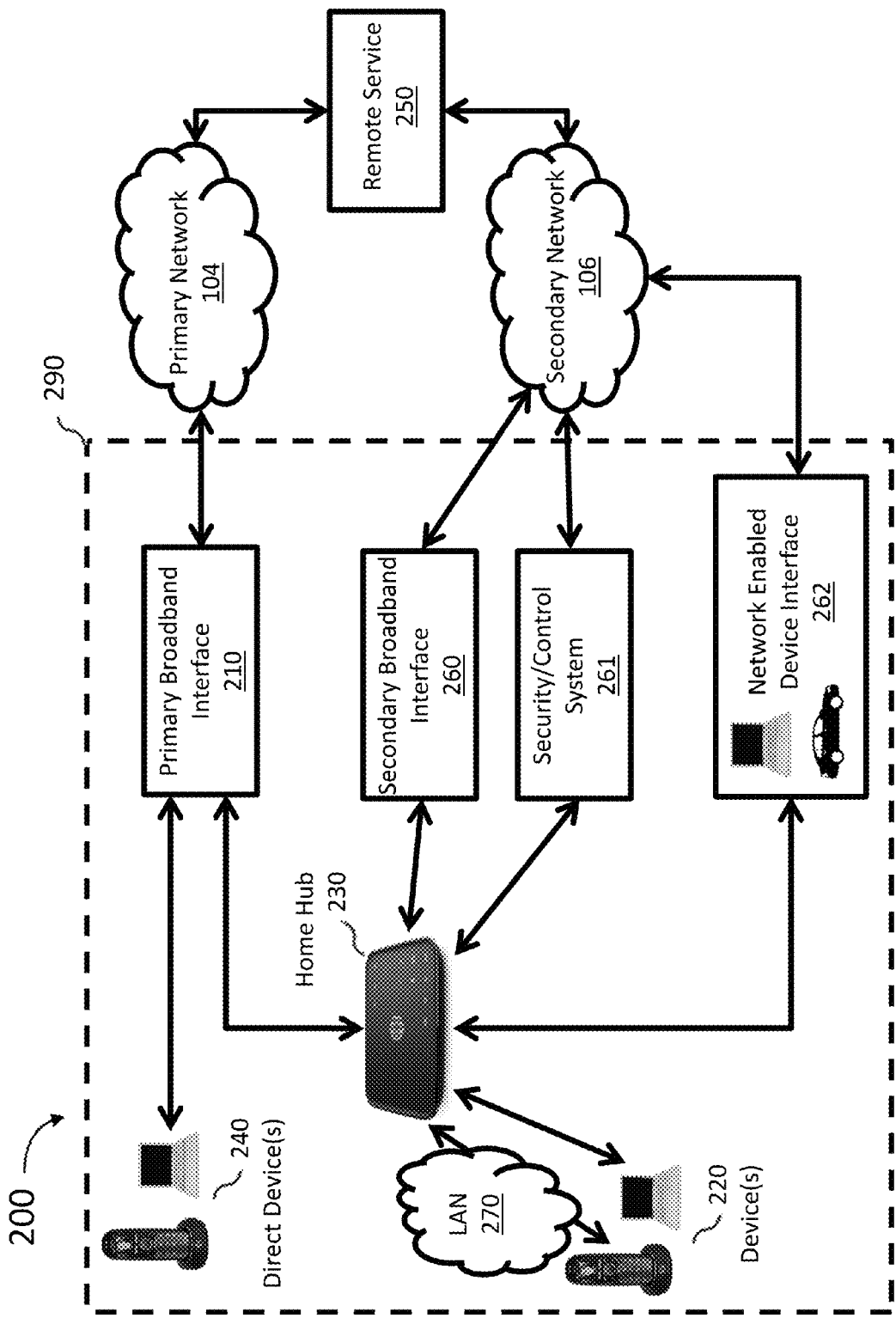
FIG. 2 is a simplified block diagram of a communications system, in accordance with various embodiments.

FIG. 2 illustrates a simplified block diagram of exemplary system 200. Premises 290 may be a home office or small office (e.g., involving 1-10 workers) which receives separate independent connections from Primary Network 104 and Secondary Network 106. Various connections shown in FIG. 2 between each component (e.g., between Home Hub 230 and various access mechanisms 210, 260 261 and 262) may be wired (e.g., Ethernet, USB, or similar) and/or wireless (e.g., WiFi, Bluetooth, or similar). In some embodiments, various end devices, such as computers, tablets, mobile phones, Digital Enhanced Cordless Telecommunications (DECT) phones, wired telephone handsets, etc. are connected to the Internet, directly over IP or over protocols through adapters. Primary Broadband Interface 210 connects end devices to the Internet, and on to various services, via Primary Network 104.

Some end devices, Device(s) 220, connect via a specialized Home Hub 230 to the Primary Broadband Interface 210 and on to Primary Network 104. Home Hub 230 provides additional services and capabilities beyond simple transmission of data, as described below. Additionally, some end devices, Direct Device(s) 240, may be connected to the primary network (via the primary broadband interface) without using home hub. That is, they may traverse other conventional networking devices such as adapters, switches, hubs, routers, gateways, etc., but not through the home hub. Device(s) 220, Direct Device(s) 240, and Home Hub 230 connect to one or more Remote Service(s) 250 Primary Network 104 to obtain services.

Additionally, Home Hub 230 has access to one or more separate network(s), Secondary Network 106. When things are operating normally, Primary Network 104 is used via Primary Broadband Interface 210, but in other circumstances (described below), Secondary Network 106 may be used, for example to send redundant information (e.g., to reconstruct the "bad"—corrupted and/or delayed—transmission on Primary Network 104) or (substantially) all information. For example, a checksum or error correcting code (ECC) approach is used, where additional bits are produced as a mathematical result of a calculation performed on the original bits. If the data is corrupted, the checksum or error correcting bits can be used to detect and/or even correct the corrupted or missing data. For example, at least one of a repetition code, parity bit, checksum, cyclic redundancy check (CRC), cryptographic hash function, error-correcting code (e.g., forward error correction (FEC) or channel coding), combinations thereof, and the like is used for error detection. By way of further non-limiting example, at least one of an error-correcting code (e.g., forward error correction (FEC) or channel coding), convolutional code, a block code (e.g., Reed-Solomon code, Hamming code, Hadamard code, Expander code, Golay code, Reed-Muller code, etc.), combinations thereof, and the like is used for error correction. By sending the redundant information (e.g., as described above for error detection and/or error correction) over the Secondary Network 106, such techniques can be used to detect and/or recover data lost over Primary Network 104.

Secondary Network 106 may be accessed in several ways. In some embodiments, the connection is through a dedicated Secondary Network Interface Device 260 (e.g., a second broadband service, WiMAX, and dedicated 4G modem/hotspot). Home Hub 230 may use Secondary Network Interface Device 260 to connect to Secondary Network 106 in order to access Remote Service 250.

In various embodiments, the connection to Secondary Network 106 is made through Security/Control System 261. Consumer and small office environments may have security and/or automation system(s). For example, Security/Control System 261 provides alarm services and allows remote control of lighting, cameras, sprinklers, etc. Security/Control System 261 can be wired to traditional telephone connections or via wired broadband connections, but increasingly, Security/Control System 261 incorporates or is connected to a wireless service, for example, through a cellular modem (3G/4G) that allows Security/Control System 261 to maintain a data connection even when wired phone lines and/or broadband connections are disrupted or tampered with. Home Hub 230 may connect to Security/Control System 261, taking advantage of a connection of Security/Control System 261 as Secondary Network 106 to access Remote Service 250.

In various embodiments, the connection to the secondary network is made through a Network Enabled Device Interface 262. For example, numerous network-enabled devices (e.g., network-capable consumer devices; not shown in FIG. 2) may be present in or about the home or small business. A network-enabled device is an electronic device, generally connected to other devices or networks via different wireless protocols such as Bluetooth, NFC, WiFi, 4G, and the like (e.g., as described in relation to Secondary Network 106), that can operate to some extent interactively and autonomously. Smart devices include, by way of non-limiting example, a cellular phone, smartphone, phablet, tablet computer, e-reader (also known as an e-book reader or e-book device), smartwatch, smart band, smart keychain, automobile providing an Internet connection (e.g., in-car internet generally provisioned through mobile phone data networks, such as those described in relation to Secondary Network 106), and gaming system, each having a respective network connection and the capability of sharing this connection. Home Hub 230 may use one or more of these network enabled device interfaces(s) as Secondary Network 106 to access Remote Service 250.

Home Hub 230 may be as simple as a special purpose home router, but in exemplary embodiments, Home Hub 230 is a home/small office communications device that provides some additional capabilities. For example, Home Hub 230 provides authentication, packet prioritization, and optimization properties supporting a communications system. By way of further non-limiting example, Home Hub 230 provides interfaces to connect non-IP devices (e.g., phones), via mechanisms such as Bluetooth, DECT, or conventional analog phone lines. In some embodiments Home Hub 230 interfaces with other devices to provide (or itself provide) home security and/or home automation functions. In addition, Home Hub 230 provides redundant network capabilities as described below.

Device(s) 220 connect to Home Hub 230 either directly (e.g., through the interfaces described above such as DECT, analog phone, Bluetooth, etc.) or via LAN Network 270 (e.g., provided by Home Hub 230 via WiFi, Ethernet, etc.). Device(s) 220 connected to LAN Network 270 or directly to the home hub using one of its interfaces can reach either Primary Network 104 or Secondary Network 106 as described below. In various embodiments, Device(s) 220 could be a telephone (e.g., a non-IP phone such as a DECT and/or Bluetooth handset), computer, or tablet connected via Home Hub 230, and using Remote Service 250 to provide telephony services.

In some embodiments, Home Hub 230 and/or Remote Service 250—independently, together, and/or in concert with one or more Device 220—determine the performance of Primary Network 104, and select between the primary network (e.g., via Primary Broadband Interface Device 210) and Secondary Network 106 (e.g., via interfaces 260, 261, and/or 262) to help ensure service is uninterrupted (e.g., at a desired QoS).

In various embodiments, Secondary Network 106 has a higher cost, requires more power, has more limited capabilities, etc. than Primary Network 104. Accordingly, there may be an incentive to continue monitoring Primary Network 104 and move traffic back to Primary Network 104 when and if service is again adequate (e.g., has an acceptable QoS). This will vary depending on the specific deployment and needs of the system. In an exemplary embodiment, Primary Network 104 may be a flat-rate broadband connection, while Secondary Network 106 is subject to billing parameters (e.g., a usage cap, bandwidth being charged in increments (such that the more data is sent over Secondary Network 106, the higher the bill), etc.) which create a sufficient financial incentive to use Primary Network 104. Remote Service 250 may alert the user or responsible party of usage on Secondary Network 106 to help prevent costs incurred by usage overruns, etc.

In some embodiments, Direct Device(s) 240 are connected directly to the Primary Broadband Interface Device 210—not via Home Hub 230—and are not able to take advantage of Secondary Network 106 without modification. Because they connect via the home hub, Devices 220 require no modification, as discussed below.

As a real-time session takes place, various mechanisms can be used to monitor the performance of the sessions. One major performance issue that can occur is the loss of packets of information. In response, packets may be sometimes be retransmitted, redundancy increased, or quality reduced. In addition, in various embodiments loss will indicate a need to use the Secondary Network 106. There are numerous ways to monitor the session performance, including monitoring of various buffer sizes to determine when packets are missing or lost. In some embodiments, a simplified "score boarding" mechanism is used to detect the rate of lost packets.

Figure 3:
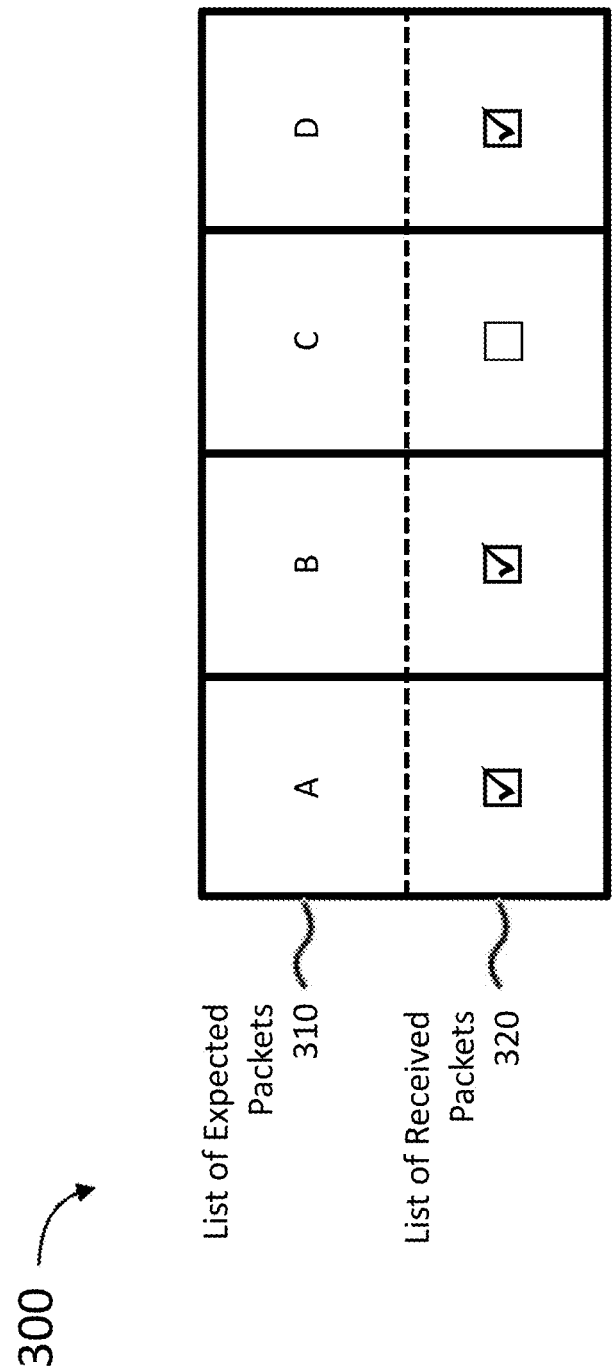
FIG. 3 illustrates a scoreboard, according to some embodiments.

FIG. 3 illustrates scoreboard 300. Scoreboard 300 includes a List of Expected Packets (or payloads) 310 based on an identifier (e.g., sequence number, packet ID, etc.), shown in FIG. 3 as letters A, B, C, etc. (other identifiers may be used). Each expected packet/payload may be checked off (e.g., using a mechanism such as flipping/toggling a bit on or off) as it arrives on List of Received Packets 320, again based on some identifier for each packet. In FIG. 3, packets A, B, and D have arrived, but C has failed to arrive. As time progresses beyond the time for acceptable latency (i.e., some number of packets), the scoreboard is examined to determine how many packets have failed to arrive. If an unacceptable number have not arrived, the receiver can respond accordingly (e.g., triggering an action such as changing redundancy level, reducing encoding quality, initiating the use of a secondary channel, performing/capturing diagnostics, etc.). Scoreboard 300 offers the benefit of simplicity and effectiveness.

In addition (or alternatively) to the very simple score boarding mechanism above, Home Hub 230, Remote Service 250, and/or one of Device 220 may use other mechanisms to detect degradation in performance and initiate a change to Secondary Network 106. For example, by detecting an increase in packet loss some other way, changes to jitter buffer size, detecting packets are significantly delayed, directly measuring reductions in audio quality, etc.

Referring back to FIG. 2, in various embodiments Device(s) 220 is connected directly to an interface on Home Hub 230 other than via LAN 270, and Home Hub 230 then connects to Remote Service 250. For example, Device(s) 220 may be an analog phone connected directly to Home Hub 230. In some embodiments, Home Hub 230 or Remote Service 250 detects the degradation and initiates (e.g., using a signal) a switch to Secondary Network 106. This signaling can occur in a number of ways. In an exemplary implementation, SIP is used to set up the calls. While the IP address of Remote Service 250 may be unchanged, special headers, URL parameters, message bodies, or other aspects of SIP can be used between the Home Hub 230 and Remote Service 250 (initiated by either side), to request that Home Hub 230 and Remote Service 250 communicate via Secondary Network 106. In various embodiments, this message could also be carried as a special control messages in the media itself (RTP or RTCP message) rather than in the signaling channel. Other protocols can be used. By way of non-limiting example, one or more of the ITU H.323 family of protocols, Extensible Messaging and Presence Protocol (XMPP), Jingle (e.g., an extension to XMPP adding peer-to-peer (P2P) session control (signaling) for multimedia interactions such as in Voice over IP (VoIP) or videoconferencing communications), and the like are used.

In some embodiments, Device(s) 220 is an IP device connected over LAN 270, and Home Hub 230 actively participate in the session. That is, Home Hub 230 is aware of the session and mediating it in some way that allows it to intervene, for example, by relaying the media packets actively and/or serving as a back-to-back user agent (B2BUA). For example, a B2BUA is a logical network element in SIP applications, where SIP is a signaling protocol to manage multimedia Voice over Internet Protocol (VoIP) telephone calls. A B2BUA operates between both end points of a phone call or communications session, divides the communication channel into two call legs, and mediates all SIP signaling between both ends of the call, from call establishment to termination. Any of the Home Hub 230, Device(s) 220, and Remote Service 250 may notice the degradation, and signal the others to switch to the secondary network. As Home Hub 230 participates in the call in some material way—that is, it is aware of the call and the media flowing through it—Home Hub 230 and/or Remote Service 250 can signal to each other to use the secondary channel, as described above.

In various embodiments, Device(s) 220 is an IP device connected over the LAN 270, but Home Hub 230 is not actively participating in the call (e.g., it may be routing packets, but is not involved in and/or aware of the actual media session traversing it). However, Remote Service 250 is aware that the Home Hub 230 has access to a Secondary Network 106. In this case, a novel mechanism may be used to move the traffic over to the secondary network.

Prior to detecting conditions under which there is a switch to the Secondary Network 106, or at such time a switch to Secondary Network 106 is indicated, in some embodiments, Home Hub 230 and Remote Service 250 communicate to determine if a secondary channel is available. If so, the Home Hub 230 reserves some number of private IP addresses, and may use these internally on the LAN 270 as needed as a mechanism to allow Device(s) 220 connected to the LAN to reach the remote service over Secondary Network 106. Any packets sent to this private address(es) are translated by the home hub to the globally routable address(es) of the remote service, but are sent over Secondary Network 106, rather than Primary Network 104.

Packets sent to Device(s) 220 from Remote Service 250 over the secondary network may be translated by Home Hub 230 to appear as if they originated from the reserved private address(es), rather than the globally routable address(es) of the remote service. The effect of this is to give the remote service two addresses as seen from the device: the service's normal, globally routable address, for which traffic is carried over the primary network, and a second, private address on the LAN, to and from which traffic will have addresses translated, and be routed over Secondary Network 106.

Figure 4:
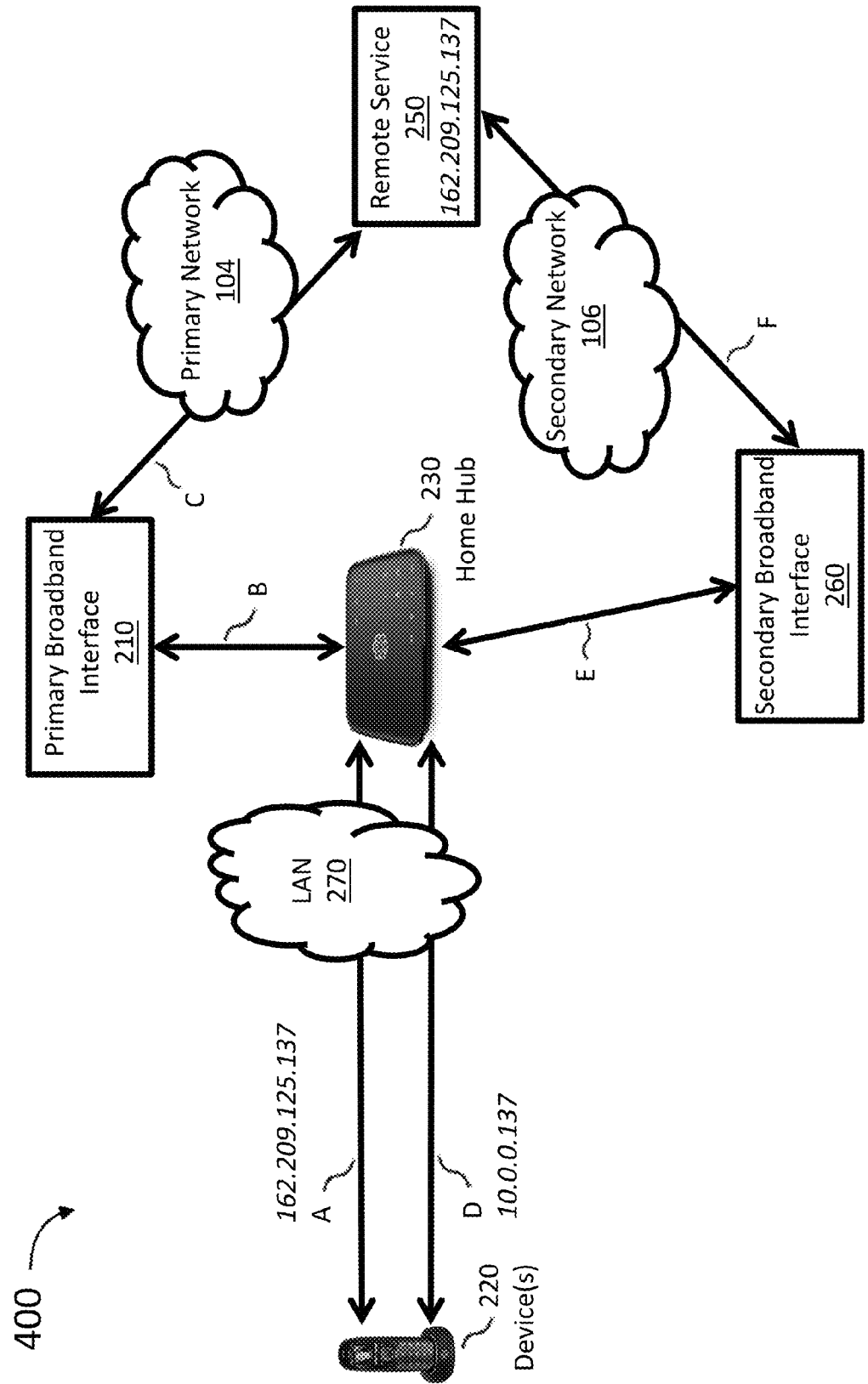
FIG. 4 is a simplified block diagram illustrating data flow, in accordance with various embodiments.

FIG. 4 illustrates some embodiments of exemplary system 400 in more detail. Device(s) 220 is connected to LAN 270, and is unmodified in any way. Device(s) 220 is unaware Home Hub 230 has second network capabilities. Remote Service 250 is reachable over the Internet at globally routable address 162.209.125.137. Home Hub 230 reserves an address from the defined set of private, non-globally routable addresses, and assigns this on the LAN to Remote Service 250 as required. In this case, Home Hub 230 assigns 10.0.0.137 (a private address as defined by RFC 1918) to Remote Service 250. This transaction may occur at any time prior to the use of the secondary channel.

When Device(s) 220 first places a call to Remote Service 250, it uses the (well known) globally routable address 162.209.125.137 to reach the service, in step A. Home Hub 230 uses Primary Broadband Interface 210 to reach Primary Network 104 and pass the information to the remote service, in steps B and C. If the session (e.g., a phone call) proceeds normally, the session remains on Primary Network 104. If however, the connection degrades over time, Remote Service 250 may send a control message back to Device(s) 220 requesting information be sent over Secondary Network 106, and providing the reserved address 10.0.0.137 negotiated between Home Hub 230 and Remote Service 250 at some point before (including immediately before) the switch is made. Device(s) 220 may send the data for the session to 10.0.0.137, in step D. Home Hub 230 translates this to the globally routed address 162.209.125.137, sending it over Secondary Network 106 through Secondary Broadband Interface 260 in steps E and F.

Home Hub 230 could also use Security/Control System 261, Network Enabled Device Interface 262, or some other mechanism to reach Secondary Network 106. Similarly, any messages arriving at Home Hub 230 from Remote Service 250 arriving over the secondary network and intended for the device are translated back to appear as if originating from 10.0.0.137 before being sent on, ensuring that Device(s) 220 operates as if 10.0.0.137 is the new/correct address of Remote Service 250.

Note that translation of addresses may simply be at the IP level (only modifying IP address headers), but may also include application-specific packet inspection and rewriting of internal addresses used by the protocol (i.e., application layer address changes), depending on the requirements of the application and the particular deployment.

Figure 5:
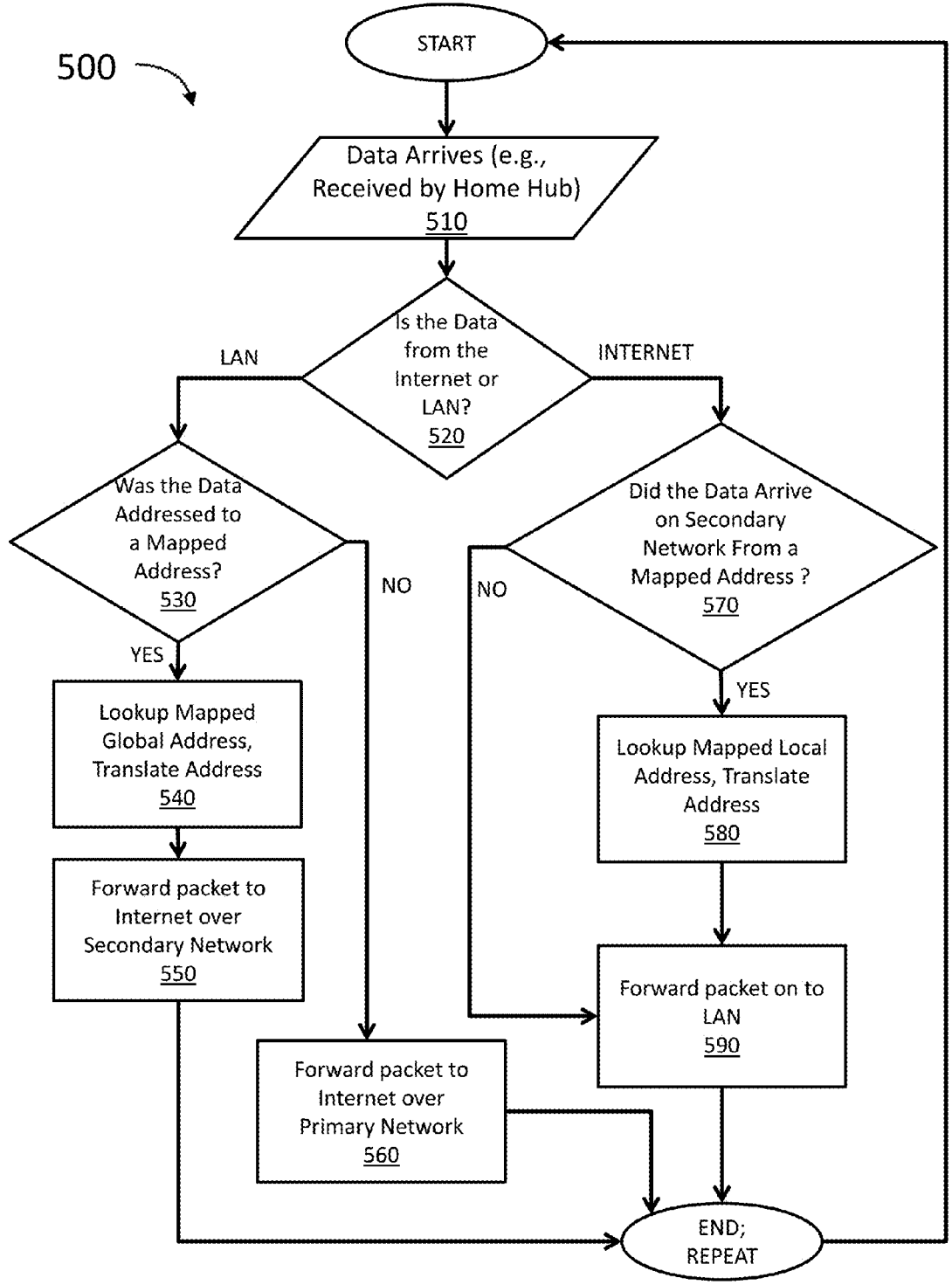
FIG. 5 is a simplified flow diagram of a method for routing and readdressing packets, according to various embodiments.

FIG. 5 is a flowchart 500 illustrating decisions made by the Home Hub 230 in order to route a message. A packet arrives at Home Hub 230 in step 510. At step 520, it is determined if the packet has arrived from the Internet or the LAN. If it is from the LAN, the packet is next checked at step 530 to see if the address the packet was addressed to is a private address that the home hub has mapped to Remote Service 250. If so, Home Hub 230 looks up the global address the local address is mapped to and translates the address in the packet at step 540. In step 550, the packet is then sent over to Secondary Network 106. If the packet received from the LAN was not addressed to a mapped private address, the packet address is not translated, and it is forwarded over the Primary Network 104 at step 560. The process then repeats as new packets arrive.

If the packet reaching the Home Hub 230 is determined to come from the Internet in step 520, the packet is next examined to see if it arrived from the Secondary Network 106, and if it was received from a Remote Service 250 that is mapped to a local address in step 570. If both conditions are true, the local reserved address corresponding to this remote service is looked up, and the packet translated to show as originating from this local address in step 580. If either condition is not true, step 580 is skipped. In either case, the packet is forwarded on to the LAN in step 590. The method may repeat as new packets arrive.

In some embodiments, Device(s) 220 requires no modification to take advantage of Secondary Network 106, and requires no knowledge that Home Hub 230 has a connection to Secondary Network 106. Exemplary embodiments pass the signal between Remote Service 250 and unmodified Device(s) 220 to change addresses using a SIP INVITE message. In SIP, the INVITE message is used to send requests to establish a session, including information on where (e.g., IP address or hostname) and the format to send the media. Later INVITE messages can be sent to update this information (e.g., re-INVITE mechanism), for example to transfer a call or send it to voicemail.

In various embodiments, the establishment or discontinuing of a new channel over Secondary Network 106 is performed (as needed) by sending a new SIP INVITE message containing either the globally routable address or a reserved private address, appearing to Device(s) 220 as a simple transfer. These results may be accomplished in SIP in a number of different ways, by way of non-limiting example, sending a new SIP INVITE (the re-INVITE mechanism) above, SIP REFER or NOTIFY messages, some other SIP messages, a new mechanisms or messages defined by the IETF, new or proprietary Uniform Resource Identifier (URI) parameters, new or proprietary headers, etc. Additionally, other protocols that perform similar session establishment capabilities (e.g., H.323, XMPP, etc.) could be used.

In some embodiments, Remote Service 250 communicates a switch from Primary Network 104 and Secondary Network 106 (and vice versa) to the Device(s) 220 within the media stream (e.g., carried by RTP and RTCP) or a different logical channel. For example, this signaling is in-band over the actual media stream using IETF RTP messages with special headers or payload packages. By way of further non-limiting example, these messages are sent over the control portion of the media channel, for example, in IETF RTPC messages. By way of further example, these messages could consist of messages in another media or real-time control protocol. In yet another example, this information could be conveyed over a different logical channel, potentially using a proprietary protocol. While none of these methods are standard behavior of current devices (unlike some of the embodiments above), and would require the device to be modified, the modifications are advantageous.

In various embodiments, Remote Service 250 communicates with Device(s) 220 in advance (e.g., prior to experiencing a lost and/or delayed packets), informing of it of the availability of an address that can be used to reach it via Secondary Network 106 should the need arise. Such an approach requires modification of Device(s) 220, including some level of awareness of Secondary Network 106 by the device. In this way, even in situations in which Primary Network 104 completely fails can be handled. Requests to use Secondary Network 106 can be sent in numerous ways—for example, by sending a new SIP INVITE, SIP REFER or NOTIFY messages, other SIP messages, new mechanisms or messages defined by the IETF, new or proprietary URI parameters, new or proprietary headers, etc.; by using a different protocol with similar session establishment capabilities; by messages inside the media stream; by using messages in the media control stream; by using messages another logical connection; and the like.

Figure 6:
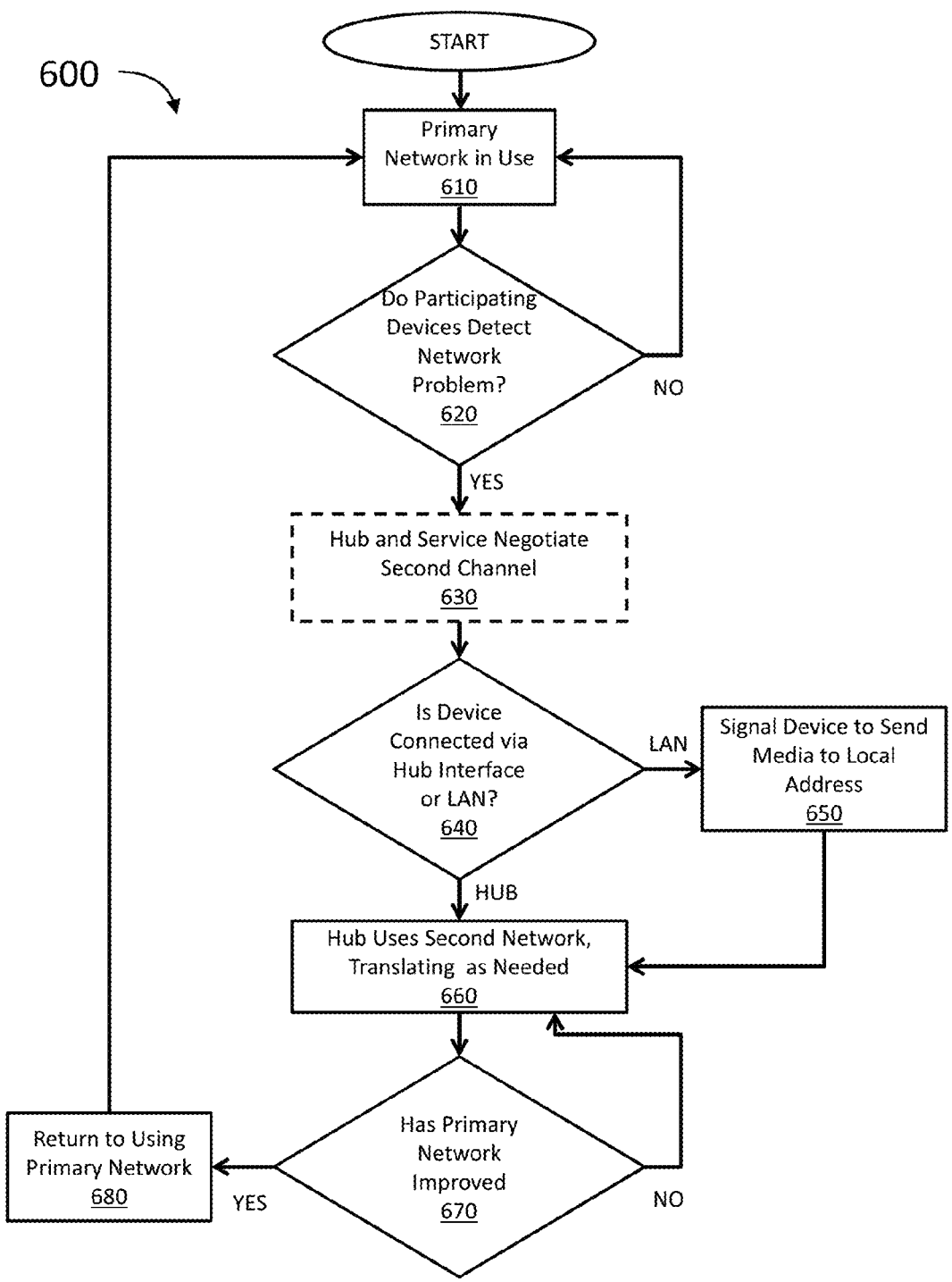
FIG. 6 is a simplified flow diagram of a method for determining whether to use a primary or secondary network, in accordance with some embodiments.

FIG. 6 is a flowchart for method 600 of using Secondary Network 106. At step 610, the Primary Network 104 is used for communications. At step 620, a determination is made whether network problems are detected by any of the participating parties (e.g., Home Hub 230, Remote Service 250, and in some cases Device(s) 220). If problems are not detected, the parties continue to use Primary Network 104. If a problem is detected, Home Hub 230 and Remote Service 250 negotiate a second channel in step 630. Step 630 is optional, because negotiating a second channel may have been done in advance, for example, when Home Hub 230 boots or authenticates. At step 640, it is determined whether Device(s) 220 is connected to LAN 270 and is communicating directly with Remote Service 250. If so, Remote Service 250 signals directly to Device(s) 220 in step 650 with a new, local address to use to reach it—the address mapped over the secondary network by Home Hub 230.

In step 660, Home Hub 230 begins using Secondary Network 106, translating packets as needed for devices connected over the LAN 270. At step 670, the participating devices check if the Primary Network 104 has improved, and if so, return to using Primary Network 104 in step 680.

Otherwise, the devices continue to use Secondary Network 106, checking Primary Network 104 again periodically to see if it has improved.

Detecting restoration of an acceptable quality of service (e.g., problem detected at Step 620 is resolved or mitigated) may be performed actively and/or passively. For example, Home Hub 230 actively transmits probe traffic (e.g., test/diagnostic packets) over Primary Network 104 to Remote Service 250 to ascertain performance of Primary Network 104 (e.g., does network bandwidth (measured in bits per second (bps), megabits per second (Mbps), gigabits per second (Gbps), and the like) satisfy a (predetermined) threshold). The probe traffic may be from a ping utility (e.g., Internet Control Message Protocol (ICMP) echo request packets sent to Remote Service 250). Using the presence and/or absence of an ICMP response (e.g., from Remote Service 250), the time from transmission to reception (e.g., round-trip time) and any packet loss may be measured and the measurements compared to preset or user-defined limits. The probe traffic may (alternatively or additionally) be simulated data traffic, such as (simulated) streamed media (e.g., audio and video). Home Hub 230 may also analyze passive data (e.g., not responsive to probe packets and arising during the course of regular operation) originating and/or terminating over Primary Network 104 and ascertain, for example, whether the rate of incoming packets increase and/or a number (e.g., fraction, percentage, etc.) of dropped/discarded packets decreases (e.g., above or below a respective predetermined threshold).

In some embodiments, Home Hub 230 and Remote Service 250 pre-negotiate the availability of Secondary Network 106 and private network mappings. For example, they could negotiate the connection address(es) at boot or authentication time of Home Hub 230.

In various embodiments, Home Hub 230 and Remote Service 250 negotiate the use of Secondary Network 106 only as needed (e.g., on an as needed or demand basis). This mechanism allows for more than one secondary network, with different choices being made available and used depending upon the quality, cost to transmit information, available bandwidth, etc.

For each of the foregoing descriptions, in all cases the role of sender and receiver, as well as primary and secondary designations are logical roles, and may be reversed.

Figure 7:
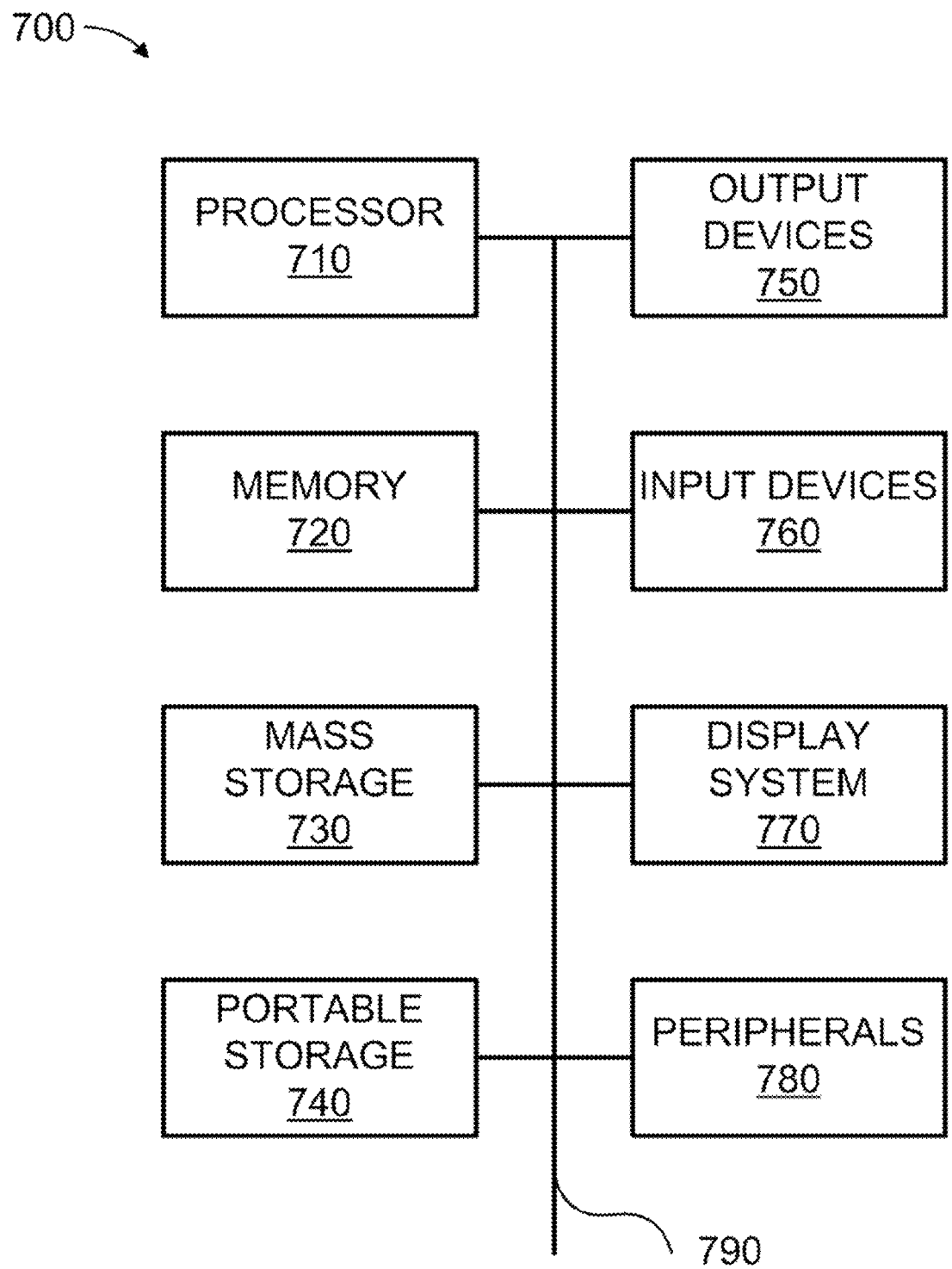
FIG. 7 is a simplified block diagram of a computing system, according to various embodiments.

FIG. 7 illustrates an exemplary computer system 700 that may be used to implement some embodiments of the present invention. The computer system 700 in FIG. 7 may be implemented in the contexts of the likes of computing systems, networks, servers, or combinations thereof. The computer system 700 in FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 in FIG. 7 further includes a mass data storage 730, portable storage device 740, output devices 750, user input devices 760, a graphics display system 770, and peripheral device(s) 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 in FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral device(s) 780 may include any type of computer support device to add additional functionality to the computer system.

The components provided in the computer system 700 in FIG. 7 are those typically found in computer systems that may be suitable for use with embodiments of the present disclosure and are intended to represent a broad category of such computer components that are well known in the art. Thus, the computer system 700 in FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 700 may be implemented as a cloud-based computing environment, such as a virtual machine operating within a computing cloud. In other embodiments, the computing system 700 may itself include a cloud-based computing environment, where the functionalities of the computing system 700 are executed in a distributed fashion. Thus, the computing system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A method for managing alternative networks comprising:
    receiving a first predetermined range of addresses including a first address;
    receiving a second predetermined range of addresses including a second address;
    providing the first address to a computing device;
    providing a first data packet to a first interface, the first data packet including the first address and being received from the computing device, the first interface coupled to a first broadband connection received at a premises, the first broadband connection being coupled to a service outside the premises using a first data network;
    receiving from the computing device a second data packet including the second address using a third interface, the third interface coupled to the computing device at the premises;
    modifying the second data packet including replacing the second address with the first address;
    sending the modified second data packet to a second interface, the second interface coupled to a second broadband connection received at the premises, the second broadband connection being coupled to the service outside the premises using a second data network and being different from the first broadband connection;
    receiving from the service outside the premises a third data packet including the first address;
    modifying the third data packet including replacing the first address with the second address when the third data packet is received from the second interface;
    giving the modified third data packet to the third interface;
    receiving from the computing device a fourth data packet including the first address; and
    giving the fourth data packet to the first interface.

2. The method of claim 1, wherein the first predetermined range of addresses and the second predetermined range of addresses are received from the service outside the premises.

3. The method of claim 1, wherein an analog telephone is communicatively coupled to the computing device.

4. The method of claim 1, further comprising:
    monitoring an amount of data transferred associated with the second broadband connection; and
    issuing at least one alert in response to the amount exceeding at least one predetermined threshold, the at least one predetermined threshold being associated with billing parameters associated with the second broadband connection.

5. The method of claim 1, further comprising:
communicating with the service outside the premises using the first interface to establish communications through the second broadband connection, the communicating including at least one of a Session Initiation Protocol (SIP) message, SIP header, Uniform Resource Identifier (URI) parameter, Real-time Transport Control Protocol (RTCP) message, and Real-time Transport Protocol (RTP) packet.

6. The method of claim 1, wherein:
the first broadband connection is at least one of a leased T-carrier line, Synchronous Optical Networking (SONET), Synchronous Digital Hierarchy (SDH), cable internet access, Digital Subscriber Line (DSL), Fiber-to-the-home (FTTH), Broadband over power lines (BPL), Wi-Fi, WiMAX, mobile broadband, and satellite broadband;
the second broadband connection is at least one of a leased T-carrier line, Synchronous Optical Networking (SONET), Synchronous Digital Hierarchy (SDH), cable internet access, Digital Subscriber Line (DSL), Fiber-to-the-home (FTTH), Broadband over power lines (BPL), Wi-Fi, WiMAX, and mobile broadband; and
the third interface is coupled to a local data network, the local data network including at least one of a wired local area network (LAN), wireless LAN, and wireless communications using one or more of Digital Enhanced Cordless Telecommunications (DECT), Bluetooth, and Bluetooth low energy.

7. The method of claim 6, wherein the second broadband connection is associated with at least one of an alarm system, mobile device, network capable consumer device, and in-car Internet system located on or about the premises.

8. A system for managing alternative networks comprising:
a first interface coupled to a first broadband connection received at a premises, the first broadband connection being coupled to a service outside the premises using a first data network;
a second interface coupled to a second broadband connection received at the premises, the second broadband connection being coupled to the service outside the premises using a second data network and being different from the first broadband connection;
a third interface coupled to a computing device at the premises;
a processor coupled to the first, second, and third interfaces; and
a memory coupled to the processor, the memory storing instructions executable by the processor to perform a method comprising:
receiving a first predetermined range of addresses including a first address;
receiving a second predetermined range of addresses including a second address;
providing the first address to the computing device;
providing a first data packet to the first interface, the first data packet including the first address and being received from the computing device;
receiving from the computing device a second data packet including the second address;
modifying the second data packet including replacing the second address with the first address;
sending the modified second data packet to the second interface;
receiving from the service outside the premises a third data packet including the first address;
modifying the third data packet including replacing the first address with the second address when the third data packet is received from the second interface;
giving the modified third data packet to the third interface;
receiving from the computing device a fourth data packet including the first address; and
giving the fourth data packet to the first interface.

9. The system of claim 8, wherein the first predetermined range of addresses and the second predetermined range of addresses are received from the service outside the premises.

10. The system of claim 8, further comprising:
an analog telephone communicatively coupled to the computing device, the computing device being integrated with the system.

11. The system of claim 8, wherein the method further comprises:
monitoring an amount of data transferred associated with the second broadband connection; and
issuing at least one alert in response to the amount exceeding at least one predetermined threshold, the at least one predetermined threshold being associated with billing parameters associated with the second broadband connection.

12. The system of claim 8, wherein the method further comprises:
communicating with the service outside the premises using the first interface to establish communications through the second broadband connection, the communicating including at least one of a Session Initiation Protocol (SIP) message, SIP header, Uniform Resource Identifier (URI) parameter, Real-time Transport Control Protocol (RTCP) message, and Real-time Transport Protocol (RTP) packet.

13. The system of claim 8, wherein:
the first broadband connection is at least one of a leased T-carrier line, Synchronous Optical Networking (SONET), Synchronous Digital Hierarchy (SDH), cable internet access, Digital Subscriber Line (DSL), Fiber-to-the-home (FTTH), Broadband over power lines (BPL), Wi-Fi, WiMAX, mobile broadband, and satellite broadband;
the second broadband connection is at least one of a leased T-carrier line, Synchronous Optical Networking (SONET), Synchronous Digital Hierarchy (SDH), cable internet access, Digital Subscriber Line (DSL), Fiber-to-the-home (FTTH), Broadband over power lines (BPL), Wi-Fi, WiMAX, and mobile broadband; and
the third interface is coupled to a local data network, the local data network including at least one of a wired local area network (LAN), wireless LAN, and wireless communications using one or more of Digital Enhanced Cordless Telecommunications (DECT), Bluetooth, and Bluetooth low energy.

14. The system of claim 13, wherein the second broadband connection is associated with at least one of an alarm system, mobile device, network capable consumer device, and in-car Internet system located on or about the premises.

* * * * *